Figure 1:
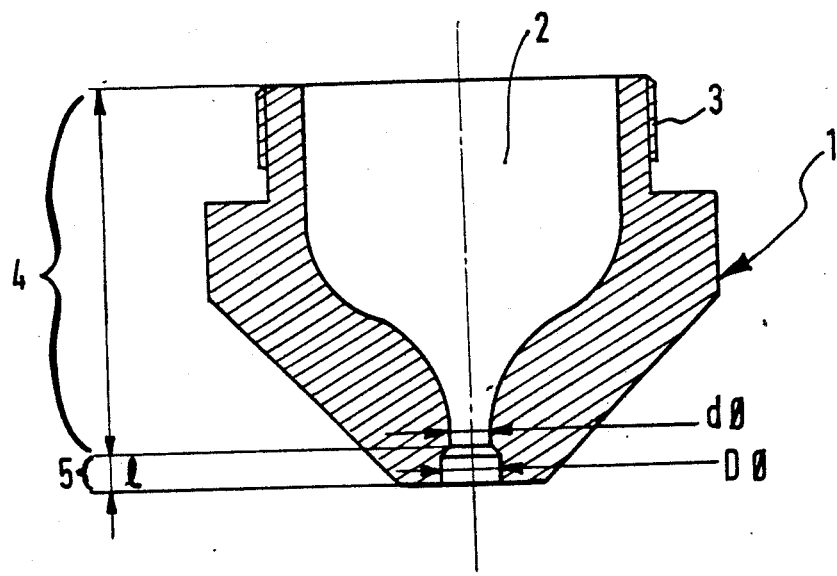

United States Patent [19]

Van Der Have et al.

[11] Patent Number: 4,913,405
[45] Date of Patent: Apr. 3, 1990

[54] LASER CUTTING NOZZLE, CUTTING HEAD COMPRISING SAID NOZZLE AND LASER CUTTING METHOD USING SAID ELEMENTS

[75] Inventors: Philippe Van Der Have, Paris; Christian Le Gall, Eragny-sur-Oise, both of France

[73] Assignee: L'air Liquide, Societe Anonyme pour l'Etude et l'Exploitation des Procedes Georges Claude, Paris, France

[21] Appl. No.: 301,704

[22] Filed: Jan. 26, 1989

[30] Foreign Application Priority Data

Feb. 3, 1988 [FR] France .............................. 88 01240

[51] Int. Cl.$^4$ .............................................. B23K 26/14
[52] U.S. Cl. .................................. 266/48; 219/121.67
[58] Field of Search ................... 266/48, 77; 148/9 R; 219/121.65, 121.66, 121.67

[56] References Cited

U.S. PATENT DOCUMENTS 4,618,758 10/1986 Gilli et al. ...................... 219/121.67
4,728,771 3/1988 Sartorio .......................... 219/121.67
4,780,592 10/1988 Rothe et al. .................... 219/121.67

FOREIGN PATENT DOCUMENTS 55-141392 11/1980 Japan .
56-136295 10/1981 Japan .
60-108192 6/1985 Japan .

Primary Examiner—S. Kastler
Attorney, Agent, or Firm—Young & Thompson

[57] ABSTRACT

The invention relates to a laser cutting nozzle comprising at least two subsequent coaxial sections, the inside diameter of the first section decreasing from its inlet diameter to its outlet diameter and being devoid of a sharp corner, the inner envelope being tangent at its outlet to a cylinder having a diameter d, the second section being cylindrical and having a diameter D and a length l, the ratio D/d being between 1.1 and 1.3 and the ratio l/d being between 0.35 and 1. It relates to a laser cutting head comprising this nozzle and to a laser cutting method employing these elements.

5 Claims, 1 Drawing Sheet

LASER CUTTING NOZZLE, CUTTING HEAD COMPRISING SAID NOZZLE AND LASER CUTTING METHOD USING SAID ELEMENTS

The present invention relates to a laser cutting nozzle, a laser cutting head provided with said nozzle, and a laser cutting method employing said elements. Lasers are at the present time employed in industry in particular for work carried out on all materials in applications as varied as cutting, welding, marking or surface treatment.

Usually, in cutting, the laser beam issuing from the power source is directed by reflection on at least one movable or fixed mirror toward a lens by which it is focused in proximity to the work piece to be treated. An assistance gas is injected in the region of the work piece by means of a cutting head placed between the lens and the work piece. The cutting head carries a nozzle and they include a central orifice through which pass the assistance gas and the focused laser beam.

The quality and the rate of the cutting are determined on one hand by the power and the optical quality of the beam and on the other hand by the quality and speed of the gas jet.

However, in the case of black steels, still termed low alloy carbon steels, or ordinary steels, or mild steels, in particular, where the assistance gas is usually oxygen, a high speed and even a supersonic jet of oxygen does not permit reaching high cutting rates, since this rate is in any case limited by the speed of oxidation of the material to be cut.

The nozzles employed up to the present time for cutting do not allow the gas flow to be stabilized and their utilization only permits obtaining modest cutting performances from the point of view of the quality and the cutting rates. Modifications in the direction of the cut also result in cutting defects; the turbulences of the jet also leave traces visible on the cutting surfaces.

It is the shape of the nozzle which is determinant in the quality of the cut.

The claimed present invention overcomes these drawbacks and provides a laser cutting nozzle which comprises at least two subsequent coaxial sections, the inside diameter of the first section decreasing from its inlet diameter to its outlet diameter, the inner envelope being tangent at its outlet to a cylinder of diameter d, the second section being cylindrical and having a diameter D and a length l, and the ratio D/d being between 1.1 and 1.3 and the ratio l/d being between 0.35 and 1.

It is advantageous in accordance with the invention to arrange that the internal envelope of the first section be devoid of a sharp corner.

Indeed, this arrangement results in still more stable turbulence-free gas flows.

These features, which will be described in more detail hereinafter, result in a high-performance cutting with a reasonable gas consumption. Outside the ranges of dimension defined according to the invention, the cutting rates deteriorate.

The present invention also relates to laser cutting heads equipped with nozzles according to the invention.

The present invention also provides a method for the laser cutting of a material of the type employing a laser power source, means for transmitting the laser beam, a cutting head for a laser beam having an assistance gas, wherein the assistance gas has a sonic speed and the laser nozzle is that defined hereinbefore according to the invention.

Such a method and nozzle are in particular adapted to the cutting of black steels, in particular black steels having a thickness of about 6 to 15 mm, as will be apparent from the following detailed description.

Other features and advantages of the invention will appear from the detailed description with reference to the single FIG. 1 which shows a nozzle according to the invention.

FIG. 1 shows a cylindrical nozzle 1 with an axial passage 2 through which pass the focused beam and the assistance gas. A screw thread 3 enables the nozzle to be fixed to the end of a cutting head (not shown).

In the first section 4, the passage 2 has no sharp corner. The downstream end of the first section 4 is tangent to a cylinder having a diameter d.

The second section 5, following on the first section 4, is cylindrical and has a diameter D.

The upstream end of the section 5 is frustoconical, as is possible to obtain by machining.

A nozzle such as that described hereinbefore according to an invention was made from copper and mounted on the head of a convention laser cutting device, the power source being a laser employing $CO_2$ (power 1,500 W) and the assistance gas being oxygen. The shape of the inner envelope is formed by two tangent arcs of a circle, one of which is convex whereas the other is concave, the inner envelope having a vertical tangent at the downstream end of the first secton 4. In this embodiment of the invention, the length l is about 1 mm.

A black steel 8 mm thick was cut at the rate of 1.50 m/min. with a rate of flow of gas of 60 to 70 l/min. (sonic speed).

An index of the quality of the cut was defined (i ranging from 1 to 5, as seen by the eye): $i \times \Delta v$ is a test of the quality of the nozzle ($\Delta v$=maximum reference speed obtained — effective speed).

In comparison, a cut was effected on the same steel under similar conditions i.e. with a nozzle of the Laval nozzle type having an inside diameter of 2.8 mm and an end diameter of 4 mm, for a cutting rate of 1.2 m/min. and a flow rate of 100 l/min.

Under these conditions there is obtained: $i \times \Delta v = 10\%$.

We claim:

1. Laser cutting nozzle comprising at least two subsequent coaxial sections, a first of said sections having an inlet and an outlet and an inside diameter which decreases from said inlet to said outlet, and having an inner envelope which is tangent at said outlet to a cylinder having a diameter d, the second section of said sections being cylindrical and having a diameter D and a length l, the ratio D/d being between 1.1 and 1.3 and the ratio l/d being between 0.35 and 1.

2. Nozzle according to claim 1, wherein the envelope of the first section is devoid of a sharp corner.

3. Nozzle according to claim 1, wherein the inner envelope is constituted by two tangent arcs of a circle, one of said arcs being convex and the other of said arcs being concave, the inner envelope having a vertical tangent at the outlet end of the first section.

4. Nozzle according to claim 1, wherein the length l is about 1 mm.

5. Laser cutting head comprising a laser cutting nozzle comprising at least two subsequent coaxial sections, a first of said sections having an inlet and an outlet and an inside diameter which decreases from said inlet to said outlet, and having an inner envelope which is tangent at said outlet to a cylinder having a diameter d, the second section of said sections being cylindrical and having a diameter D and a length l, the ratio D/d being between 1.1 and 1.3 and the ration l/d being between 0.35 and 1.

* * * * *